(12) United States Patent
Poddar

(10) Patent No.: US 9,390,463 B2
(45) Date of Patent: Jul. 12, 2016

(54) TECHNIQUES FOR REDUCING MEMORY BANDWIDTH FOR DISPLAY COMPOSITION

(71) Applicant: Intel Corporation, Santa Clara, CA (US)

(72) Inventor: Bimal Poddar, El Dorado, CA (US)

(73) Assignee: INTEL CORPORATION, Santa Clara, CA (US)

( * ) Notice: Subject to any disclaimer, the term of this patent is extended or adjusted under 35 U.S.C. 154(b) by 135 days.

(21) Appl. No.: 13/965,087

(22) Filed: Aug. 12, 2013

(65) Prior Publication Data

US 2015/0042667 A1   Feb. 12, 2015

(51) Int. Cl.
| | |
|---|---|
| *G09G 5/02* | (2006.01) |
| *G06T 1/60* | (2006.01) |
| *G09G 5/14* | (2006.01) |
| *G09G 5/393* | (2006.01) |
| *G06T 15/50* | (2011.01) |

(52) U.S. Cl.
CPC ............ *G06T 1/60* (2013.01); *G06T 15/503* (2013.01); *G09G 5/14* (2013.01); *G09G 5/393* (2013.01); *G09G 2340/10* (2013.01); *G09G 2340/12* (2013.01); *G09G 2360/122* (2013.01)

(58) Field of Classification Search
None
See application file for complete search history.

(56) References Cited

U.S. PATENT DOCUMENTS

| | | | |
|---|---|---|---|
| 2002/0093516 A1* | 7/2002 | Brunner et al. | 345/629 |
| 2005/0088446 A1 | 4/2005 | Herrick et al. | |
| 2009/0064013 A1 | 3/2009 | Lee et al. | |
| 2010/0079489 A1* | 4/2010 | Cheng et al. | 345/629 |

FOREIGN PATENT DOCUMENTS

WO   00/68887   11/2000

OTHER PUBLICATIONS

Extended European Search Report received for European Patent Application No. 14178148.4-1904, mailed Dec. 12, 2014, 10 pages.

* cited by examiner

*Primary Examiner* — Yingchun He

(57) ABSTRACT

Various embodiments are generally directed to an apparatus, method and other techniques to determine color information for multiple graphical layers of a graphical display at a location of a pixel, and to determine a pixel color information for the pixel at the location based on the color information for each of the multiple graphical layers.

23 Claims, 13 Drawing Sheets

TECHNIQUES FOR REDUCING MEMORY BANDWIDTH FOR DISPLAY COMPOSITION

TECHNICAL FIELD

Embodiments described herein generally relate to determining pixel outputs for a graphical display on a display device. In particular, embodiments are directed to determining pixel color information for pixels to draw or output to a display on a display device.

BACKGROUND

Many devices such as smart phones, personal digital assists (PDA)s, tablet computers, laptop computer, or any other type of computing device include a composition engine for displaying content and information to a user through a graphical user interface (GUI) on the physical display. These GUIs are becoming more and more complex and include many layers of graphics or objects. For example, a GUI may include a background, a keyboard, applications buttons, multimedia content, application content, etc. on the display at the same time. In some instances, some or all of these layers of graphics may include some degree of transparency such that the one or more layers of graphics may be seen behind other layers of graphics. Thus, processing is required to determine a pixel output to correctly present each of the layers of graphics having transparency on a graphical display.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
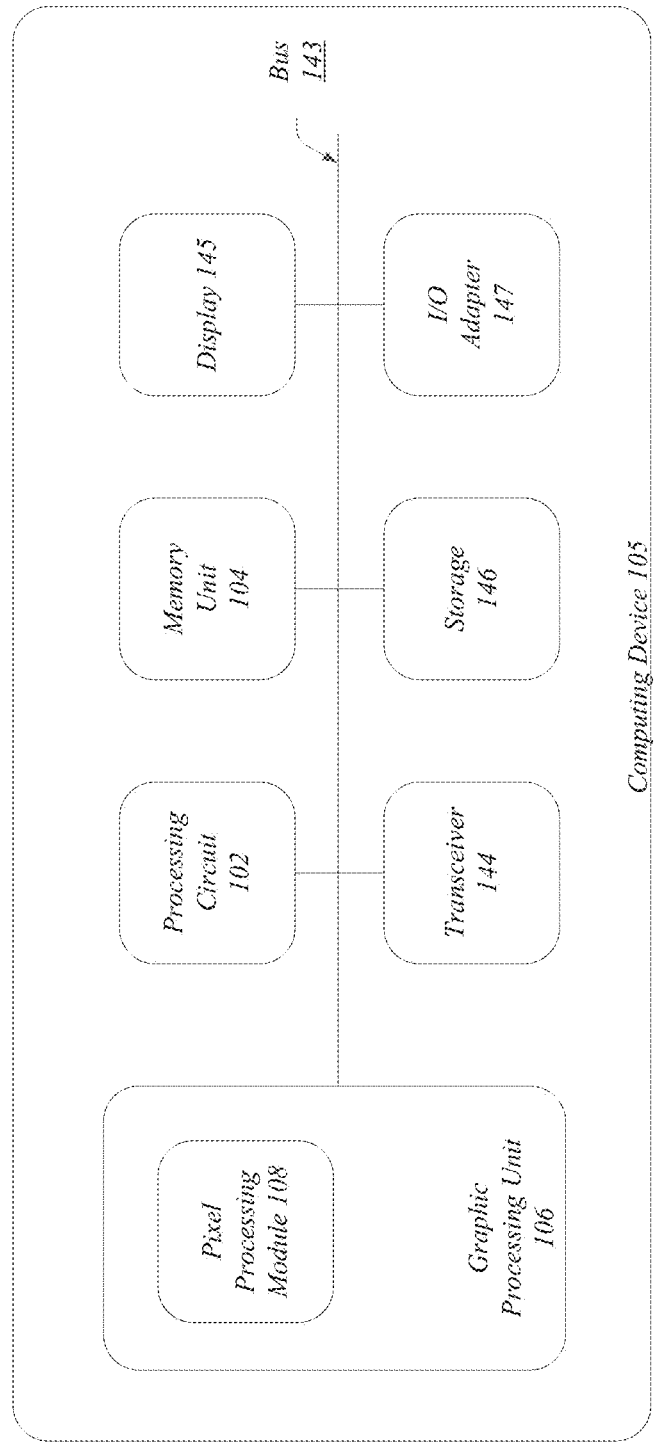
FIG. 1 illustrates an embodiment of a first computing system.

As previously discussed, graphical displays on device are becoming more and more complex with the addition of many graphical layers of graphics content concurrently presented on a display device. A graphical layer may include one or more polygons or objects having one or more vertices and vertexes to define a polygon or object. Moreover, when these layers of graphics or objects include effects such as transparency, additional processing is required to determine the correct pixel color output for each pixel presented on the graphical display. This processing may consume significant amounts of power, memory bandwidth and processing time. Mobile or portable devices, such as smart phones, personal digital assists (PDAs), tablet computers, laptop computer are at an even more disadvantage because they generally operate on battery power, include processors that may be less powerful than desktop processes and less memory. Thus, there is a need to process pixels for a graphical display in an efficient manner to limit the amount of power, processing time and memory bandwidth required to correctly output pixels for a graphical display.

One approach is to combine information for each graphical layer, such as color information, in display hardware. In this approach, the different layers are composited during scan out to a display device. However, some devices such as mobile or portable devices may not include complex enough display hardware to adequately handle processing the graphical layers during scan out.

Another approach is to process each of the graphical layers by graphics hardware, such as a graphics processing unit (GPU). Once the graphical display has been processed by the GPU, then it is scanned out or sent to a display device or projected on a surface. This approach is bandwidth intensive with many reads and writes to and from a frame buffer is required to process the graphical display. In one approach, each GUI layer is rendered to the frame buffer in a sequential manner. Each layer of rendering involves a read from the frame buffer which is then blended with the incoming layer and the result is then written out to the frame buffer. As a result, several read and write operations of the frame buffer are required to generate the composite image. However, various embodiments described herein solve this issue by reducing the amount of reads and writes to and from the frame buffer.

More specifically, in some embodiment, color information may be retrieved for graphical layers and blended to determine a pixel color prior to reading information or writing information to the frame buffer. For example, when determining a pixel color for a pixel, color information may be read from a texture buffer from each layer having the pixel located within the boundaries of the layer. As color information is read for each graphical layer, the color information is blended or combined with previously read color information to generate new color information. Once color information is read from the texture buffer for all of the layers having the pixel within their boundaries and blended once using a pixel processing component, the resulting color information may be written to the frame buffer as pixel color information. As can been seen by utilizing this approach, the frame buffer is read from and written only once after all of the color information for each layer is read and blended together. Thus, significant advantages can be realized with respect to power, bandwidth requirements and processing time.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates one embodiment of a system 100 and computing device 105. In various embodiments, system 100 may be representative of a system or architecture suitable for use with one or more embodiments described herein, such as logic flow 300 of FIG. 3, and/or logic flow 800 of FIG. 8. The embodiments are not limited in this respect.

As shown in FIG. 1, system 100 may include multiple elements. One or more elements may be implemented using one or more circuits, components, registers, processors, software subroutines, modules, or any combination thereof, as desired for a given set of design or performance constraints. Although FIG. 1 shows a limited number of elements in a certain topology by way of example, it can be appreciated that more or less elements in any suitable topology may be used in system 100 as desired for a given implementation. The embodiments are not limited in this context.

In various embodiments, system 100 may include a computing device 105 which may be any type of computer or processing device including a server, server farm, blade server, or any other type of server, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various embodiments, computing device 105 may include processing circuit 102. Processing circuit 102 may be implemented using any processor or logic device including processing circuitry. The processing circuit 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuitry on a single chip or integrated circuit. The processing circuit 102 may be connected to and communicate with the other elements of the computing system via an interconnect 143, such as one or more buses, control lines, and data lines.

In one embodiment, computing device 105 may include a memory unit 104 to couple to processor circuit 102. Memory unit 104 may be coupled to processor circuit 102 and graphics processing unit (GPU) 106 via communications bus 143, or by a dedicated communications bus between processor circuit 102 and memory unit 104, as desired for a given implementation. In some embodiments, memory unit 104 may be shared with the GPU 106 and/or any other device of computer system 105. In some embodiments, memory unit 104 may include memory cache hierarchies that reside in processing circuit 102 and GPU 106, or on a system level. These cache hierarchies may be part of a shared computer system resource. Memory unit 104 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 105 may include a graphics processing unit (GPU) 106, in various embodiments. The GPU 106 may include any processing unit, logic or circuitry optimized to perform graphics-related operations as well as the video decoder engines and the frame correlation engines. The GPU 106 may be used to render two-dimensional (2-D) and/or three-dimensional (3-D) images for various applications such as video games, graphics, computer-aided design (CAD), simulation and visualization tools, imaging, etc. Various embodiments are not limited in this manner; GPU 106 may process any type of graphics data such as pictures, videos, programs, animation, 3-D, 2-D, objects images and so forth. In some embodiments, GPU 106 may include a graphics processing pipeline having various shaders or modules for processing and rendering images on a display. For example, the graphics processing pipeline may include vertex shaders, tessellation shaders, pixel shaders and/or geometry shaders.

In some embodiments, the GPU 106 may include a pixel processing module 108 for processing pixels for a graphical display. Although the pixel processing module 108 is shown as part of the GPU 106, the pixel processing module 108 may be implemented in any hardware, such as the processing circuit 102, and/or other processing circuitry, or in any software such as a software driver or a graphics processing pipeline, or combination thereof. In various embodiments, pixel processing module 108 may include logic or instructions to process logic flow 300 of FIG. 3 and logic flow 800 of FIG. 8. In embodiments, pixel processing module 108 may include or be part of a pixel shader as part of a graphics processing pipeline including other shaders and processing modules for processing by the GPU 106.

In some embodiments, pixel processing module 108 may determine color information for a pixel at a location for one or more graphical layers having the pixel within the layer. The pixel processing module 108 may determine a location of a pixel in a graphical display and a relative layer pixel location for each of the graphical layers. The pixel processing module 108 may use the layer pixel location for the pixel for each of the layers to lookup the color information from texture buffer via a texture map.

The pixel processing module 108 may combine or blend the color information for each of the graphical layers to determine the pixel color information. In some embodiments, the pixel processing module 108 may blend the color information for each of the graphical layers when it is read or retrieved from the texture buffer with previous read color information or full-screen size graphical layer color information. The pixel processing module 204 may then send or write the pixel color information to the frame buffer 206 for presenting on a graphical display.

In some embodiments, the pixel processing module 108 does not read or write the information including color information or pixel color information to the frame buffer until all of the color information for each of the graphical layers is retrieved or read from the texture buffer 202 and blended to determine the pixel color information for a pixel.

The pixel processing module 108 may also divide a graphical display into regions or tiles such that each region fully covers or overlaps a graphical layer of the graphical display. In some embodiments, each region may have the same dimensions as one of the graphical layers in the graphical display. The pixel processing module 108 may analyze each region to determine which graphical layers have at least a portion of the layer within region. In some embodiments, the pixel processing module 108 may skip over graphical layers not in a region when processing each of the regions.

In addition, the pixel processing module 108 may be configured for each region by changing constant values, such as shader constants based on a number of graphical layers within a particular region and designating which graphical layers are in each region. In some embodiments, each region may have a different pixel processing module for processing the region or the same pixel processing module may be configured or reconfigured to process a particular region.

Further, regions having a same size as opaque graphical layers may be specially processed by stopping or exiting the pixel color determination when the opaque graphical layer is reached. More specifically, when graphical layers are processed in a front-to-back order to determine if a pixel is within a graphical layer and color information for the pixel, the process may stop when the opaque layer is reached because graphical layers behind the opaque layer cannot be seen and color information from these graphical layers are not blended with the other graphical layers color information. Therefore, by stopping the processing of the pixel at the opaque layer processing time and a memory bandwidth usage may be reduced.

In various embodiments, system 100 may include a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

In various embodiments, computing device 105 may include a display device 145. Display device 145 may constitute any display device capable of displaying information received from processor circuit 102 and/or graphics processing unit 106.

In various embodiments, computing device 105 may include storage 146. Storage 146 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 1046 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 105 may include one or more I/O adapters 147. Examples of I/O adapters 147 may include Universal Serial Bus (USB) ports/adapters, IEEE 1394 Firewire ports/adapters, and so forth. The embodiments are not limited in this context.

Figure 2:
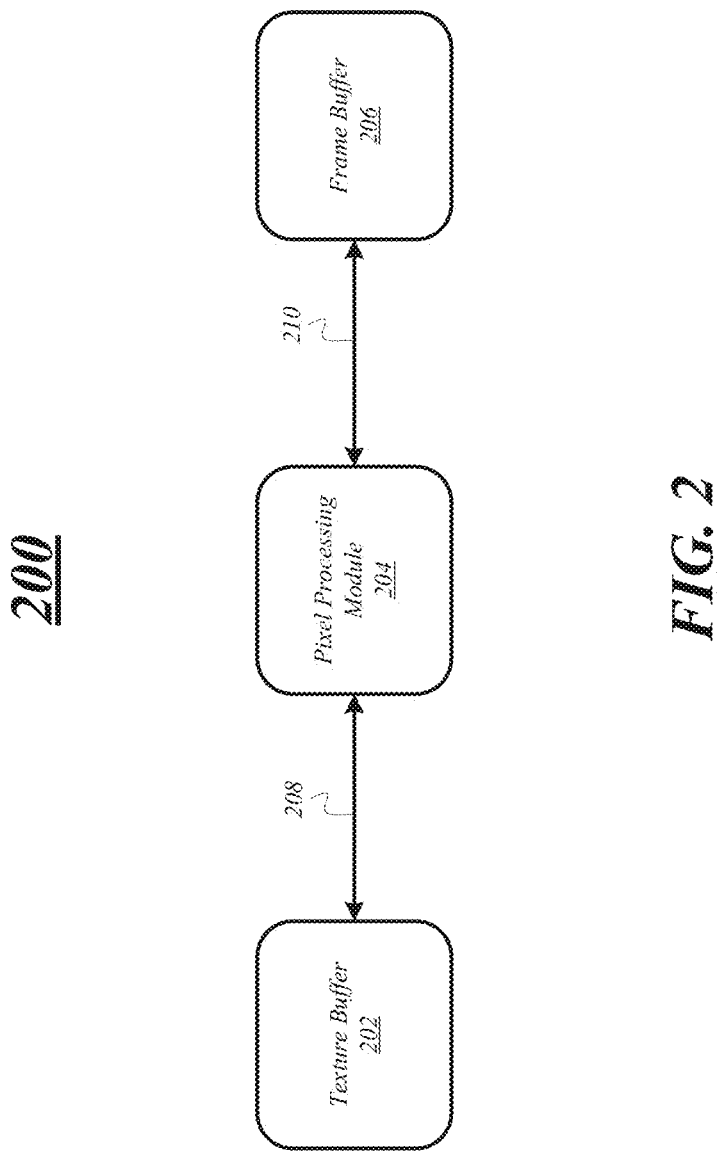
FIG. 2 illustrates an embodiment of a second computing system.

FIG. 2 illustrates an embodiment of a second computing system 200 for processing pixel information for a graphical display. In various embodiments, computing system 200 may include a texture buffer 202, a pixel processing module 204, and a frame buffer 206. The elements of computing system 200 may communicate between each other via interconnects 208 and 210, such as one or more buses, control lines, and data lines. The elements of computing system 200 may be implemented in any hardware such as GPU 106, and/or processing circuit 102 or in any software such as a software driver or a graphics processing pipeline, or combination thereof. In some embodiments, texture buffer 202 and frame buffer 206 may be implemented in memory such as memory unit 104 or in storage such as storage 146 or may be a standalone memory device.

In some embodiments, texture buffer 202 may store texture maps and data relating to the texture maps for graphical layers for a graphical display. The texture map may include texel information including color information mapped to a location for each of the graphical layers. The texel information may include red, green and blue and/or alpha (RGB/RGBA) color information. The texel information may also include other information such as, transparency information, opaque information, hue information, blending information, blurring information, shadow information, special effects information, or any other type of information related to presenting a graphical layer on a graphical display.

In some embodiments, each graphical layer on a graphical display may have a separate texture map. The texture map may be used to map color information for each of the graphical layers based on a location within the graphical layer in a two-dimensional (2D) coordinate system. As will be discussed in more detail below with respect to FIGS. 6A/6B, a location such as layer pixel location may be determined for each of the pixels within each of the graphical layers and color information may be determined or retrieved from the texture buffer 202. More specifically, the location may be used to look up the texel information including color information in the texture buffer 202 utilizing the texture map for each of the graphical layers. The layer pixel location for each of the graphical layers may be based on texture coordinates based on a mapping between a full-screen size layer and the graphical layers.

Computing system 200 may include a pixel processing module 204 for determining pixel color information for pixels of a graphical display. Pixel processing module 204 may be similar to or the same as pixel processing module 108 in FIG. 1. In various embodiments, pixel processing module 108 may include logic or instructions to process logic flow 300 of FIG. 3 and logic flow 800 of FIG. 8.

In some embodiments, pixel processing module 204 may determine color information for a pixel at a location for one or more graphical layers having the pixel within the graphical layer. In some embodiments, the pixel processing module 204 may determine a location of a pixel in a graphical display and a relative layer pixel location for each of the graphical layers. The pixel processing module 204 may use the layer pixel location for the pixel for each of the graphical layers to lookup the color information from the texture buffer 202 via a texture map.

The pixel processing module 204 may combine or blend the color information for each of the graphical layers to determine the pixel color information. In some embodiments, the pixel processing module 204 may blend each of the color information when it is read or retrieved from the texture buffer 202 with previous read color information or full-screen size graphical layer color information.

The pixel processing module 204 may send or write the pixel color information to the frame buffer 206 for presenting on a graphical display. In some embodiments, the pixel processing module 204 does not send or write the pixel color information to the frame buffer until all of the color information for each of the graphical layers is retrieved or read from the texture buffer 202 and blended to determine the pixel color information.

In some embodiments, the pixel processing module 204 may also divide a graphical display into regions or tiles such that each region fully covers or overlaps a graphical layer of the graphical display, as previously discussed above with respect to pixel processing module 108 of FIG. 1. By dividing the graphical display into regions, significant performance gains may be achieved for processing and memory usage. More specifically, the pixel processing module 204 may be specifically tailored to process each region reducing the amount of time to process a region and the graphical display and using less memory bandwidth to store data.

In various embodiments, computing system 200 may include a frame buffer 206. Frame buffer 206 may store pixel color information and related information for pixels for displaying a display device. The pixel processing module 204 may write or send the pixel color information to the frame buffer 206 for outputting to the graphical display on a display device. The pixel color information may be read from the frame buffer 206 by one or more processing devices, such as GPU 106 and/or processing circuit 102 and presented on a graphical display of a display device. The frame buffer 206 may be any type of memory for storing pixel color information and related information. In some embodiments the frame buffer 206 may be part of memory unit 104 or storage 146 or may be a standalone memory device.

Figure 3:
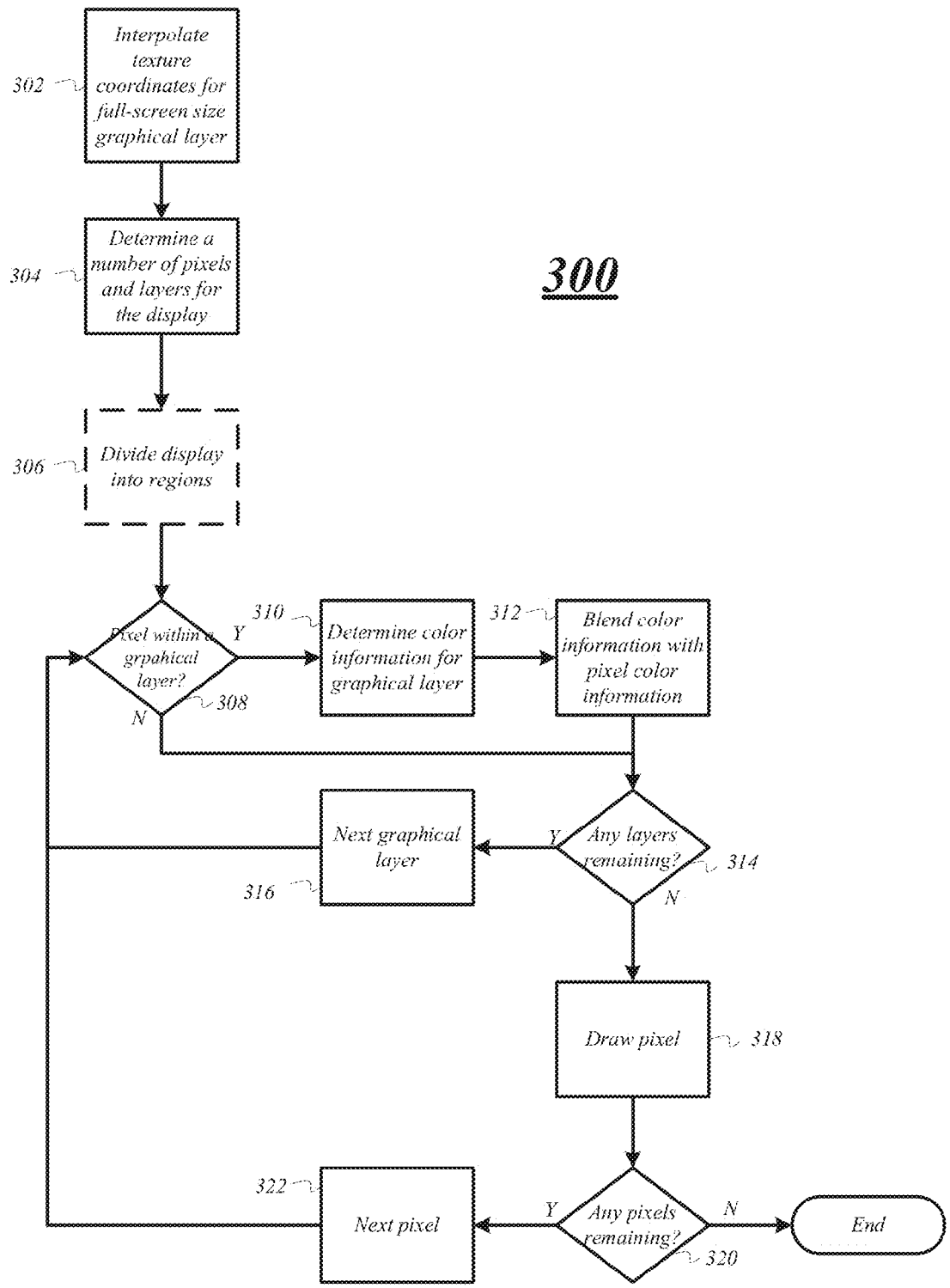
FIG. 3 illustrates embodiments of a first logic flow.

FIG. 3 illustrates logic flow 300 for determining pixel color information for pixels of a graphical display. The graphical display may be any graphical display or scene in a two-dimensional (2D) screen space that is presented on a display device, or projected onto a surface. In various embodiments, the graphical display may be a graphical user interface (GUI) that has multiple graphical layers including a background, a keyboard, icons, widgets, panels, application information, multimedia information, an application program, or any other program or information that may be presented on a graphical display.

At block 302, texture coordinates for a full-screen size graphical layer are interpolated from 0.0 to 1.0 and the full-screen size layer may be rendered, drawn or outputted to the graphical display. In various embodiments, the full-screen size layer may be a background, wallpaper or some other full-screen image and may be static or dynamic. In various embodiments, once the texture coordinates are interpolated from 0.0 to 1.0 for the full-screen size graphical layer, the pixel processing module 108 may use these interpolated texture coordinates of the full-screen size graphical layer to determine if a pixel is within one or more other graphical layers based on a mapping between the full-screen size layer and another graphical layer. These and other details will be discussed below with respect to FIGS. 6A/6B.

In various embodiments, a number of pixels in a graphical display and a number of graphical layers in a graphical display may be determined at block 304. In some embodiments, a pixel count may be initiated to zero, one or any other initialization value to use in determining if any pixels remain to be processed. In addition, a graphical layer count may be initiated to zero, one or any other initialization value to use in determining if any graphical layers remain to be processed.

At optional block 306, the graphical display may be divided into regions or tiles such that each region fully covers or overlaps a graphical layer of the graphical display. In some embodiments, each region may have the same dimensions as one of the graphical layers in the graphical display. Each region may be analyzed to determine if a pixel is within one or more graphical layers in the region. More specifically, all relevant graphical layers known to have at least portion of the graphical layer located within the region will be analyzed or processed during the determination whether a pixel is within a graphical layer. Further, graphical layers not in the region may be skipped over.

In addition, the pixel processing module 108 may be configured for each region by changing constant values, such as shader constants based on a number of graphical layers within a particular region and designating which graphical layers are in each region. In some embodiments, each region may have a different pixel processing module 108 for processing the region or the same pixel processing module 108 may be configured or reconfigured to process a particular region. Further, regions having a same size as opaque layers may be specially processed by stopping or exiting the pixel determination process when the opaque layer is reached. More specifically, when graphical layers are processed in a front-to-back order to determine if a pixel is within a graphical layer and color information for the pixel, the process may stop when the opaque layer is reached because layers behind the opaque layer cannot be seen and color information from these graphical layers are not blended with the other graphical layers color information. Therefore, by stopping the processing of the pixel at the opaque layer processing time and memory bandwidth usage may be reduced.

At block 308, a determination is made as to whether a pixel is located within a layer. In various embodiments, the graphical layers may be processed in a front-to-back order or a back-to-front order. As can be seen from blocks 310-316, the logic flow 300 loops through each of the graphical layers to determine if the pixel is within each of the graphical layers. This process is repeated for every pixel for the graphical display.

If at decision block 308 the pixel is within the graphical layer in the graphical display, color information for the graphical layer at the location of the pixel is determined at block 310. The color information may be determined by looking up the color information based on a texture map for the graphical layer in the texture buffer 202 using a layer pixel location. As will be discussed in more detail with respect to FIGS. 6A/6B, texture coordinates for the pixel in the graphical layer may be determined based on the mapping between the full-screen size graphical layer and another graphical layer to determine a layer pixel location. For example, a scaling constant and a bias constant may be used to determine the texture coordinates of the pixel in the graphical layer, where the texture coordinates are used to look up the color information for the pixel in the graphical layer.

In various embodiments, at block 312 the color information for the graphical layer determined in block 310 is blended with full-screen size graphical layer color information or previously blended color information. More specifically, after determining the color information, the pixel processing module 108 may blend or combine the color information with previously determined color information for other graphical layers and the color information for the full-screen size graphical layer to determine the pixel color information. As each graphical layer having the pixel within its boundaries is processed, the pixel color information is updated with additional color information.

If at block 308 a graphical layer is determined not to have the pixel within the graphical layer in the graphical display or after blending the color information at block 212, the pixel processing module 108 may determine if any graphical layers are left to determine if the pixel is within the graphical layer at decision block 314. For example, a comparison may be made between the graphical layer count and the total number of graphical layers determine at block 304. If graphical layers remain, the pixel processing module 108 moves to the next graphical layer at block 316 and determines if the pixel is within the next graphical layer at block 308, as previously discussed. In various embodiments, the pixel processing module 108 may go through the graphical layers in a front-to-back order or in a back-to-front order to determine if the whether the pixel is within each of the graphical layers of the graphical display.

If at block 314, the pixel processing module 108 determines that no graphical layers remain to determine if the current pixel is within a graphical layer, the pixel processing module 108 sends the pixel color information for the pixel to the frame buffer for presenting in a graphical display on a display device at block 318.

In various embodiments at decision block 320, the pixel processing module 108 determines if any pixels remain to determine pixel color information. The pixel processing module 108 may determine if any pixels remain based on a comparison between the pixel count and the total number of pixels determined at block 304.

If pixels remain at block 320, the pixel processing module 108 moves to the next pixel for processing at block 322. The pixels may be processed in a left-to-right and top-to-bottom fashion starting in the upper left hand corner of the graphical display. In some embodiments, the pixels may be processed in a right-to-left and bottom-to-top fashion. However, various embodiments are not limited in this manner, and the pixels may be processed in any order. In some embodiments at block 322, the graphical layer count may be set back to zero, one or any initialization number such that each graphical layer is analyzed as to whether the pixel is within the graphical layer or not in the graphical layer.

Figure 4:
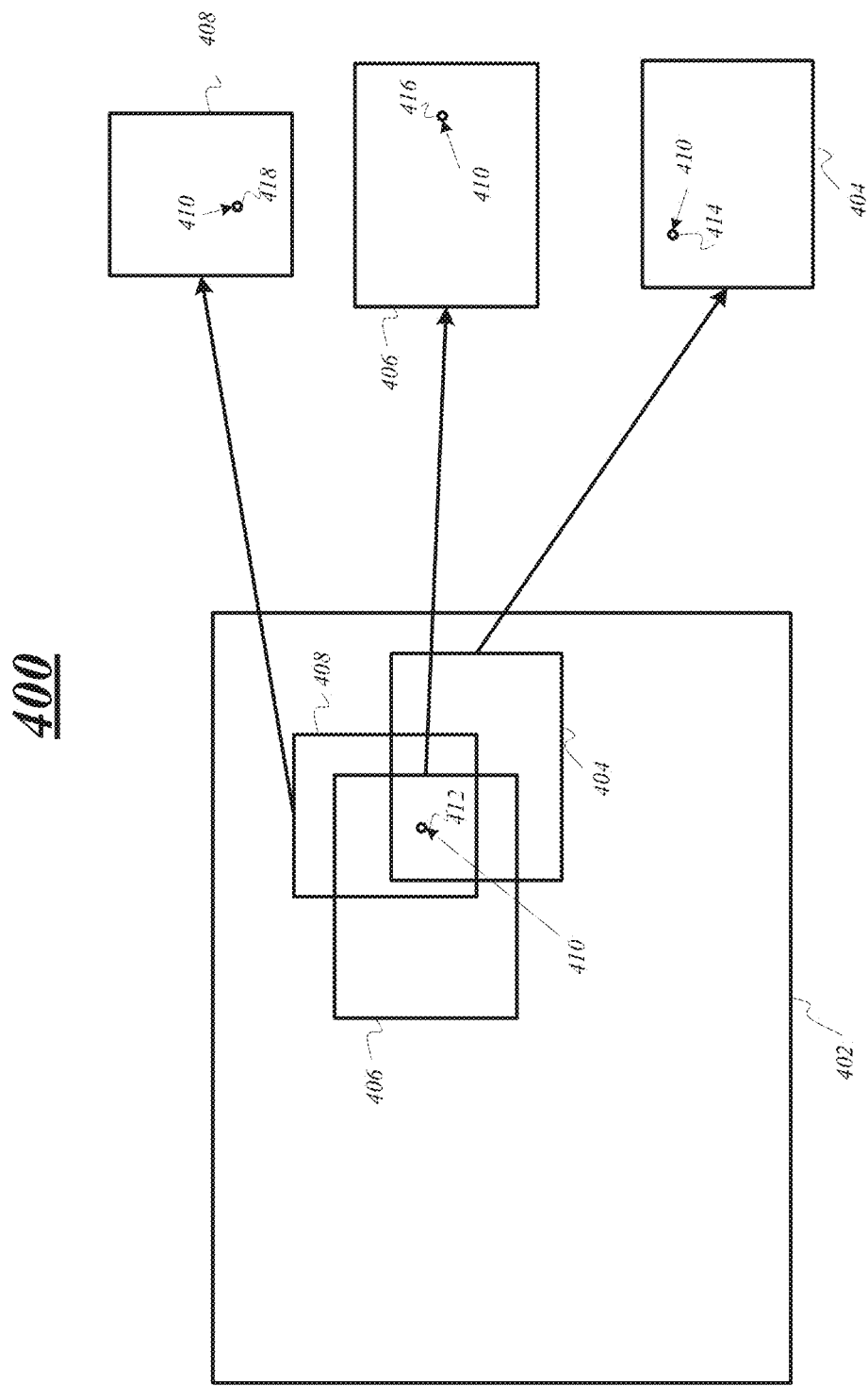
FIG. 4 illustrates an embodiment of a first graphical display of graphical layers.

FIG. 4 illustrates an embodiment of an exemplary graphical display 402 having graphical layers showing relative graphical layer pixel locations. In this embodiment, graphical display 402 is shown as having three graphical layers, 404, 406 and 408 and a pixel 410. Although graphical display 402 is only shown with three graphical layers and one pixel, graphical display 402 is not limited in this manner and may include any number of graphical layers and pixels. Graphical display 402 may be a 2D screen space and include a two-dimensional (2D) scene, a three-dimensional (3D) scene, a graphical user interface (GUI) or any type other of graphical or textual display for presenting on a display device or on a surface. Although FIG. 4 illustrates graphical layers, 404, 406 and 408 as rectangles, the graphical layers may be any shape including triangular, square, circular, or any other shape to create one or more objects for the graphical display 402.

In some embodiments, one or more of the graphical layers may be transparent or opaque and may be drawn on the graphical display 402 in a back-to-front manner. However, in various embodiments, the graphical layers are not limited in this fashion and may be drawn in the in a front-to-back. For transparent graphical layers, color information for each of the graphical layers may be blended or combined together to correctly determine the pixel color information for each pixel within the graphical layers. For example, graphical layers 404, 406 and 408 are shown as being transparent graphical layers having pixel 410 within the graphical layers. Therefore, color information for each graphical layers 404, 406 and 408 may be blended together to determine the correct pixel color information for pixel 410.

In various embodiments, the location of the pixel may be determined in the graphical display 402. For example, pixel 410 is illustrated at location 412 of the graphical display 402. The location of the pixel may be described by any coordinate system including an (x, y) where x is a number of pixels in the horizontal direction and y is a number of pixels in the vertical position having the origin (0, 0) pixel at the bottom left corner of graphical display 402. The location 412 of the pixel may also be described with reference to a full-screen size graphical layer's texture coordinates (u, v) interpolated from zero to one in both the horizontal direction and vertical direction having origin (0.0, 0.0) as the bottom left location. The texture coordinates may be used to determine the color information for the full-screen size graphical layer via a lookup or read from a texture buffer.

In addition to determining the location of the pixel within the graphical display 402 and/or the full-screen size graphical layer, a layer pixel location within each of the graphical layers may be determined based on the texture coordinates for each of the graphical layers. As shown in FIG. 4, pixel 410 may be located at layer pixel location 414 within graphical layer 404, at layer pixel location 416 within graphical layer 406 and at layer pixel location 418 within graphical layer 408. The layer pixel location for each of the graphical layers may be expressed in a coordinate system such as a texture coordinate system with the coordinates of (u, v). The texture coordinates of layer pixel location for each of the graphical layers may then be used to lookup or read color information for the graphical layers when determining the pixel color information. As previously discussed, each graphical layer will having its own textual map to determine color information for the pixel. In addition and as will be discussed in more detail below with respect to FIGS. 6A/6B, a relative layer pixel location may be determined based on the full-screen size graphical layer to determine if the pixel is within each of the graphical layers. More specifically, a scaling constant and a bias constant based on the location of the pixel within the full-screen size graphical layer may be used to determine if a pixel is within a graphical layer or is outside of the graphical layer.

Figure 5A:
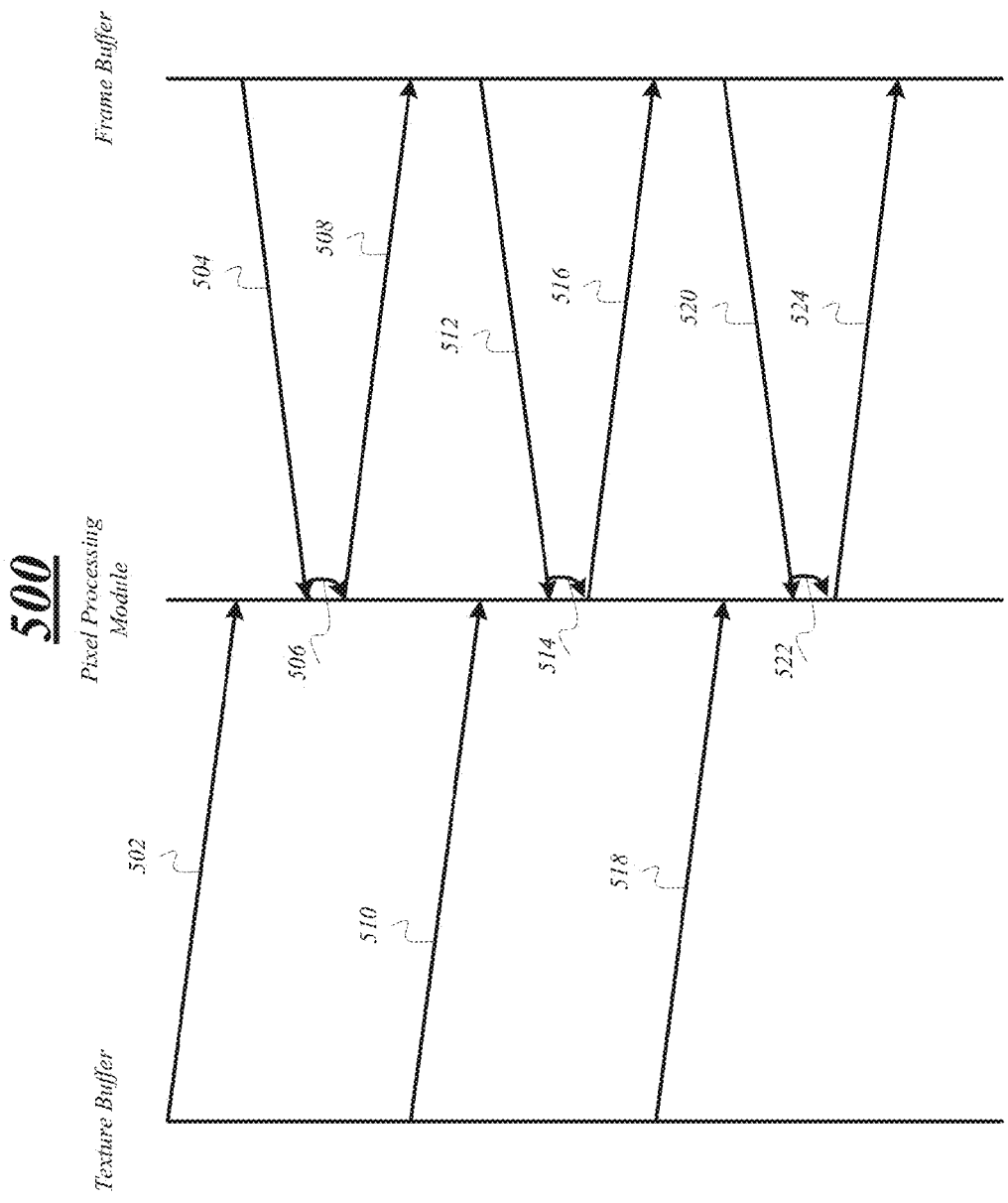
FIGS. 5A/5B illustrate embodiments of a first and second signal diagram.

FIG. 5A illustrates an embodiment of a first signaling diagram 500 for determining pixel color information for a pixel. In this exemplary embodiment, the pixel color information is based on three graphical layers having color information and transparency. The three graphical layers may be similar or the same as the three graphical layers described with respect to FIG. 4. However, the pixel color information may be based on color information for any number of graphical layers. Further, in the first signaling diagram 500, as the number of graphical layers increases, the number of reads from the texture buffer and reads and writes from the frame buffer significantly increases as will become apparent for the description of the first signaling diagram.

The first signaling diagram 500 illustrates signals between a texture buffer, pixel processing module and a frame buffer. These elements may be similar to or the same as texture buffer 202, pixel processing module 204 and frame buffer 206 described in FIG. 2 and pixel processing module 108 in FIG. 1. The first signaling diagram 500 is described from the perspective of the pixel processing module.

At signal 502, the pixel processing module may read or retrieve color information for a first graphical layer from the texture buffer based on a layer pixel location for the first graphical layer. More specifically, the pixel processing module may determine the layer pixel location of the pixel within the first graphical layer. The pixel processing module may then read the color information from the texture buffer utilizing the texture map for the first graphical layer at the layer pixel location. In various embodiments, the layer pixel location may be expressed in a 2D texture coordinate system from 0.0 to 1.0 for both the horizontal and vertical position of the pixel within the first graphical layer.

In various embodiments, the pixel processing module may then read the color information for a graphical layer underneath the first graphical layer at the location of the pixel at signal 504. For example, the color information may be for the full-screen size graphical layer for a first read from the frame buffer. The color information read from the frame buffer may be based on the location of the pixel within the graphical display or 2D screen space. The color information from the texture buffer and frame buffer may then be blended or combined to generate new color information at signal 506. Further, the new color information may become pixel color information if no other graphical layers are left for processing.

The new color information or pixel color information may be written or sent to back to the frame buffer at signal 508 for further processing. The pixel processing module may then read color information for the pixel at a layer pixel location for a second graphical layer from the texture buffer at signal 510. The pixel processing module may read the color information in a similar manner as described above with respect to signal 502. At signal 512, the pixel processing module may read color information for the pixel at the location of the pixel from the frame buffer. The color information from the frame buffer may be the previously blended color information written to the frame buffer at signal 508. The pixel processing module may blend the color information read from the texture buffer for the second graphical layer with the color information read from the frame buffer at signal 514. The new color information may then be written back to the frame buffer at signal 516.

This process may be repeated as shown with respect to signals 518-524 for every graphical layer having the pixel being processed within the boundaries of the graphical layer or until an opaque graphical layer is reached. Once all the color information for all of the graphical layers is blended, the pixel processing module may write the new color information to the frame buffer for a final time as pixel color information for presenting on a graphical display. Although not shown in this figure, the frame buffer may then be read by processing circuitry such as a GPU and the pixel may be presented on a display device based on the pixel color information in the frame buffer.

Figure 5B:
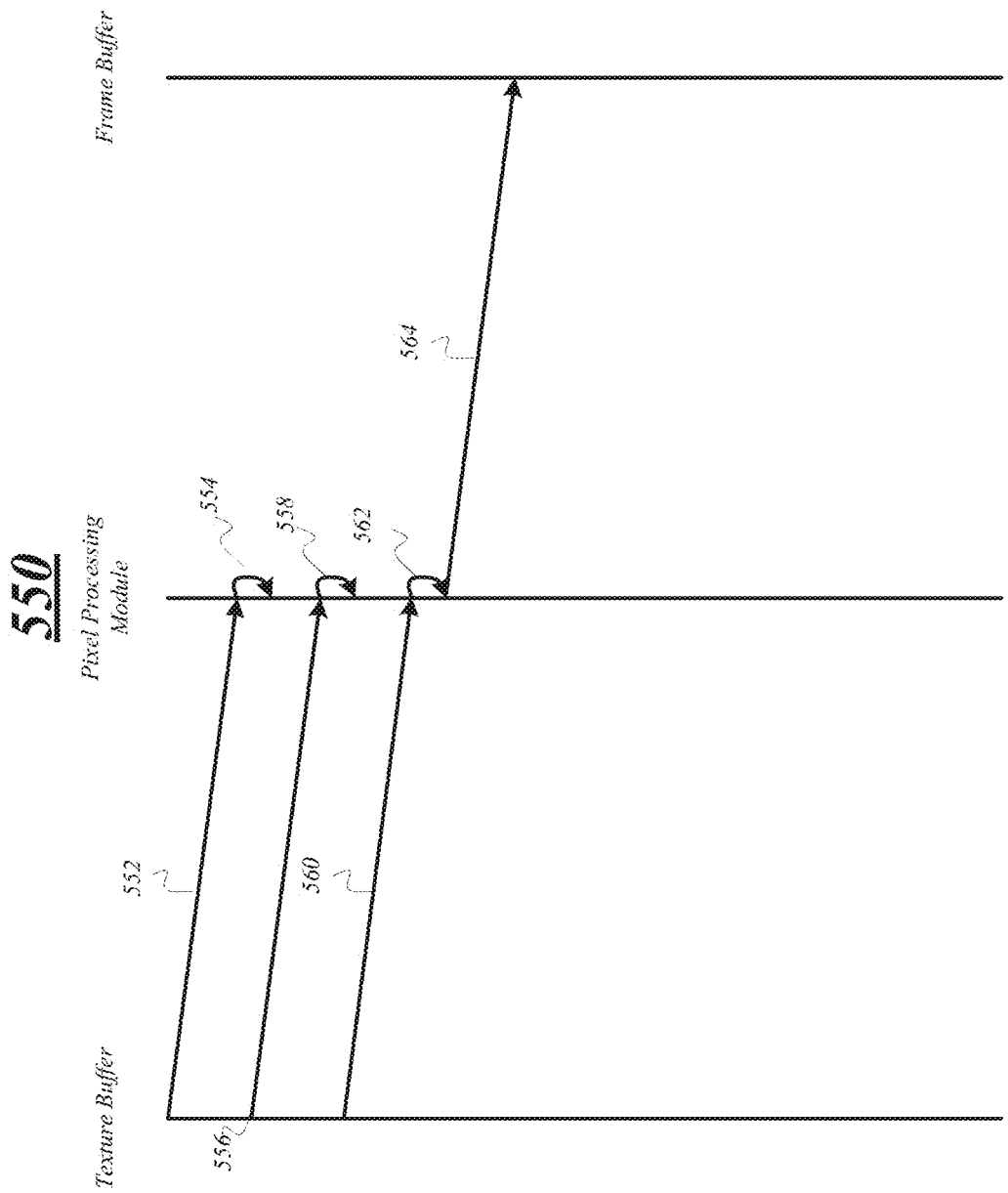

FIG. 5B illustrates an embodiment of a second signaling diagram 550 for determine pixel color information for a pixel at a location. The processing described with respect to the second signaling diagram 550 may have many advantages over the first signaling diagram 500. For example, the number of read and writes to the frame buffer to determine the pixel color information is significantly reduced, as much as one-third in some instances. In addition and by reducing the number of reads and writes to the frame buffer, the amount of memory bandwidth and power required to determine the pixel color information may also be significantly reduced. These and other advantages will become apparent with the description of the second signal diagram 550.

In various embodiments, the pixel processing module may read color information for a pixel for a first graphical layer from a texture buffer at signal 552. The pixel processing module may determine the color information for the pixel based on a texture map for the first graphical layer in the texture buffer. The pixel processing module may then blend or combine the color information with color information for a graphical layer underneath the first layer such as a full-screen size graphical layer at signal 556. The pixel processing module may determine the color information for the full-screen size graphical layer based on a previous read of the texture buffer (not shown). The pixel processing module may read the color information for a second graphical layer from the texture layer at signal 554. The color information for the second graphical layer may be blended or combined with the previously blended color information to determine new color information at signal 556. The pixel processing module may read color information for a third graphical layer at signal 560 and blend or combine the color information with the previously blended color information to determine new color information.

This processing may be repeated for a number of graphical layers having the pixel within its boundaries or until an opaque layer is reached. In this example, there are three graphical layers with the pixel within its boundaries. Therefore, after the third read from and the texture buffer and blending, the pixel processing module may write the blended color information to the frame buffer as pixel color information. In this embodiment, the pixel processing module does not read nor write to the frame buffer until all of the color information is read from the texture buffer and blended by the pixel processing module. Thus, the number of read and writes to and from the frame buffer is significantly reduced. After the pixel color information is sent or written to the frame buffer, processing circuitry such as GPU 106 may read the pixel color information for presenting on a graphical display.

Figure 6A:
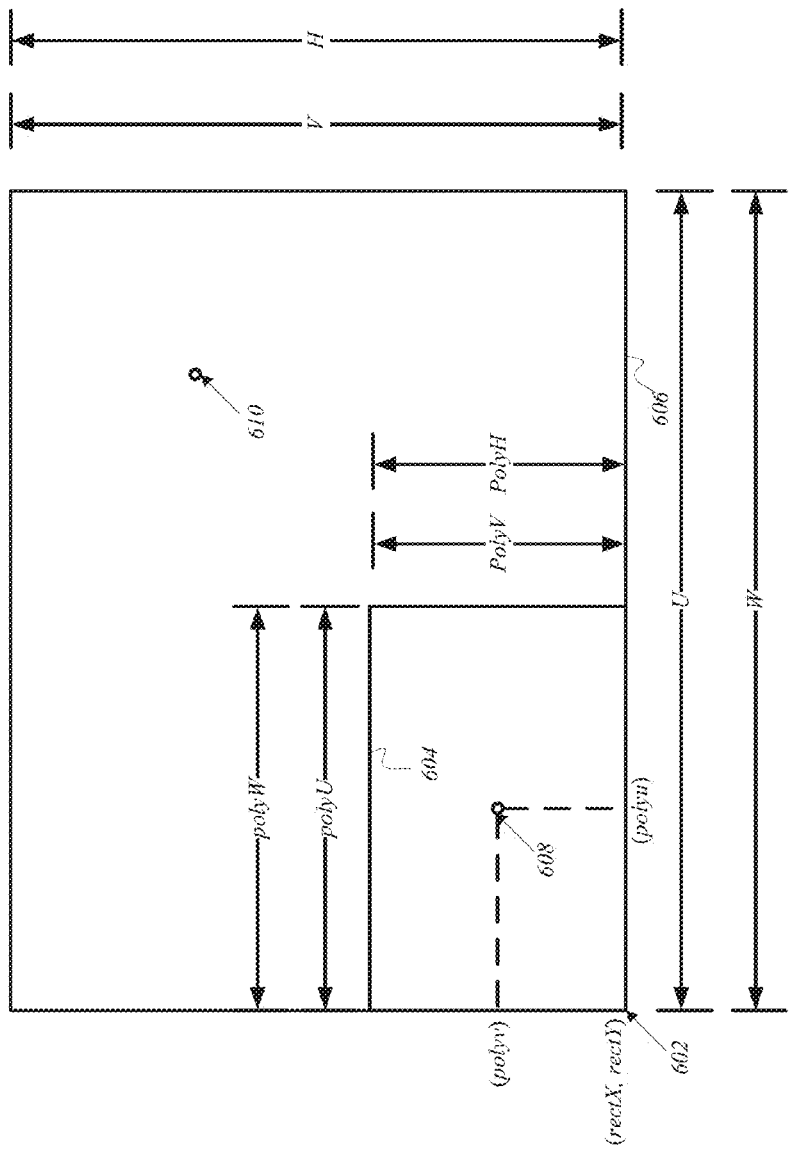
FIGS. 6A/B illustrate embodiments of a first and second graphical display diagram.

FIG. 6A illustrates a first embodiment of graphical display diagram 600 for calculating a layer pixel location relative to a full-screen size graphical layer. As previously described, each graphical layer includes a texture map having a texture coordinate system for determining color information for pixels within the graphical layer. Texture coordinates are typically from 0.0 to 1.0 in both the horizontal (u) and vertical (v) direction for each of the graphical layers. A calculation may be made to determine whether a pixel is within a graphical layer based on a relative position within a full-screen size graphical layer. This information may then be used to make a determination to either read the color information from a texture buffer for the graphical layer or to skip over the graphical layer. More specifically, a pixel processing module 202 may read the color information for the pixel at the layer pixel location if the pixel is determined to be within the boundaries of the graphical layer in the graphical display. However, if the pixel is not within the boundaries of the graphical layer, the pixel processing module skips over the graphical layer and moves on to processing the next graphical layer in the graphical display or scene.

FIG. 6A illustrates an exemplary graphical display 600 having a full-screen size graphical layer 606 and graphical layer 608. In this example, graphical layer 604 is smaller than the full-screen size layer 606. However in various embodiments, graphical layer 604 may be any size including another full-screen size graphical layer. Further, FIG. 6A only illustrates one graphical layer; however, any number of graphical layers may be within the graphical display 600.

In the example illustrated in FIG. 6A, the bottom left hand corner of the graphical layer 604 is expressed as coordinates (polyX, polyY) and is located at the origin of the graphical display 600. The coordinates polyX and polyY are expressed as number of pixels from the origin (bottom left corner) of the graphical display. In this example, the coordinate polyX=0 and coordinate polyY=0. As will be further appreciated with respect to FIG. 6B, coordinates polyX and polyY are used to determine an offset or bias for the graphical layer.

In this example, graphical display 600 includes pixel 608. Graphical display 600 only illustrates one pixel for simplification purposes for the discussing calculating whether a pixel is within graphical layer or not in a graphical layer. Graphical display 600 may include any number of pixels to generate a graphical display on a display device or surface. As illustrated, pixel 608 is located within the full-screen graphical layer 606 and graphical layer 604.

The full-screen size graphical layer 606 has a pixel width represented by W and a pixel height represented by H. The pixel width and height are represented by a number of pixels. The full-screen size graphical layer 606 also has a width based on texture coordinates represented by U in the horizontal direction and V in the vertical direction from 0.0 to 1.0. For example, the bottom left of the full-screen size graphical layer 606 has the texture coordinates of (0.0, 0.0) and the top right has texture coordinates of (1.0, 1.0).

In various embodiments, graphical layer 604 has a pixel width represented by polyW and a pixel height represented by polyH based on a number of pixels for width and height for the graphical layer 604. In addition, graphical layer 604 may have a width and height represented by polyU and polyV to determine a pixel location within the graphical layer 604 based on texture coordinates.

As will be described in more detail below, a pixel may be determined to be within the graphical layer 604 based on a scaling constant and bias constant. Further, equation 1 is used to determine if a pixel is within a graphical layer in the horizontal direction based on mapping with a full-screen size graphical layer.

$$\text{poly}u = u*(W/\text{poly}W) - \text{poly}X/\text{poly}W. \tag{1}$$

In equation 1, polyu is the horizontal texture coordinate for a pixel of a graphical layer,
u is the horizontal texture coordinate for a pixel of a full-screen size graphical layer,
W is the width of a full-screen size graphical layer in pixels,
polyW is the width of a graphical layer in pixels, and
polyX is the position of a graphical layer in the horizontal direction in pixels from the origin of a graphical display.

As is apparent from equation 1, the horizontal texture coordinate for pixels for the graphical layer 604 may be determined based on the texture coordinate of the pixel for the full-screen size graphical layer 606, scaling constant (W/polyW) and bias constant (polyX/polyW) where the scaling constant is based on the size of the graphical layer and the bias constant is based on the position of the graphical layer. Thus, equation 1 may be represented as equation 2 including the scaling constant and bias constant.

$$\text{poly}u = u*\text{scale}u + \text{bias}u. \tag{2}$$

In equation 2, polyu is the horizontal texture coordinate for a pixel of a graphical layer,
u is the horizontal texture coordinate for a pixel of a full-screen size graphical layer,
scaleu is the scaling constant, and
biasu is the bias constant in the horizontal direction.

By way of example and with reference to pixel 608 in FIG. 6A, assuming W=400 pixels, polyW=200 pixels, polyX=0 pixels and u=0.25 for the pixel 608, then polyu=0.5 indicating that the pixel is within graphical layer 604 in the horizontal direction. One aspect to note is that if polyu is greater than 1.0 or less than 0.0, the pixel is not within the graphical layer 604 in the horizontal direction and the pixel processing module may skip over determining color information for the pixel 608. However, as shown above, pixel 608 is within graphical layer 604 in the horizontal direction.

In addition, the same calculation may be made for a pixel in the vertical direction. Equation 3 is used to determine if a pixel is within a graphical layer in the vertical direction based on a full-screen size graphical layer.

$$\text{poly}v = v*(H/\text{poly}H) - \text{poly}Y/\text{poly}H. \tag{3}$$

In equation 3, polyv is the vertical texture coordinate for a pixel of a graphical layer,
v is the vertical texture coordinate for a pixel of a full-screen size graphical layer,
H is the height of a full-screen size graphical layer in pixels,
polyH is the height of a graphical layer in pixels, and
polyY is the position of a graphical layer in the vertical direction in pixels from the origin of a graphical display.

As can be seen from equation 3, the vertical texture coordinate for pixels for the graphical layer 604 may be determined based on the texture coordinate of the pixel for the full-screen size graphical layer 606, scaling constant (H/polyH) and bias constant (polyY/polyH) where the scaling constant is based on the size of the graphical layer and the bias constant is based on the position of the graphical layer. Thus, equation 3 may be represented as equation 4 including the scaling constant and bias constant.

$$\text{poly}v = v*\text{scale}v + \text{bias}v. \tag{4}$$

In equation 4, polyv is the vertical texture coordinate for pixel of a graphical layer,
v is the vertical texture coordinate for a pixel of a full-screen size graphical layer,
scalev is the scaling constant, and
biasv is the bias constant in the vertical direction.

By way of another example and with reference to pixel 608 in FIG. 6A, assuming H=400 pixels, polyH=150 pixels, polyY=0 pixels and v=0.1875 for the pixel 608 in the full-screen size graphical layer then polyv=0.5, indicating that the pixel is within graphical layer 604 in the vertical direction. One aspect to note is that if polyv is greater than 1.0 or less than 0.0, the pixel is not within the graphical layer 604 in the vertical direction and the pixel processing module may skip over determining color information for the pixel 608. However, as shown above, pixel 608 is within graphical layer 608 in the vertical direction and color information may be looked up via the texture map for the graphical layer 604 using the polyu and polyv texture coordinates. The color information for graphical layer 604 and full-screen size layer 606 may be determined based on texture coordinates for the respective graphical layer and combined or blended, as previously described above with respect to FIGS. 2-5B.

Figure 6B:
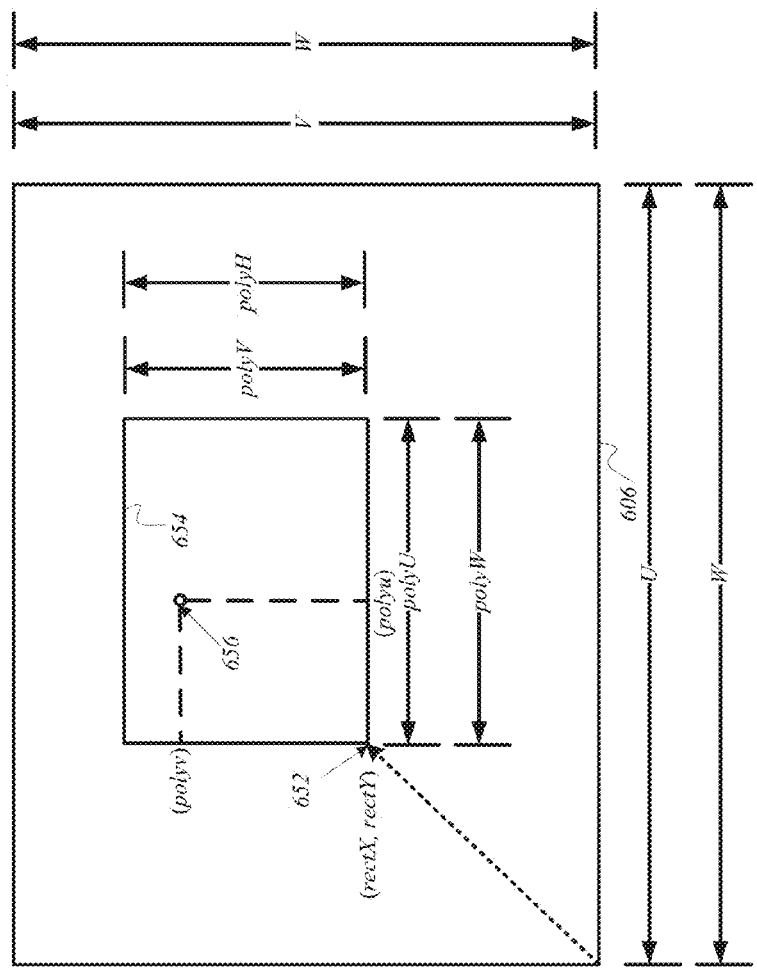

FIG. 6B illustrates a second embodiment of graphical display diagram 650 for calculating a layer pixel location relative to a full-screen size graphical layer. In this exemplary embodiment, graphical display diagram 650 includes a full-screen size graphical layer 606, a graphical layer 654 and a pixel 656. Further the graphical layer 654 may be at position 652 having coordinates rectX and rectY based a distance in pixels from the origin of the graphical display in the horizontal direction and vertical direction, where the origin is at (0, 0).

This exemplary embodiment may be used to illustrate calculating whether the pixel 656 is within graphical layer 654 using equations 1-4 with the graphical layer 654 not at the origin of the graphical display. The graphical layer 654 may located anywhere within the graphical display and full-screen size graphical layer 606. Further, graphical display diagram 650 only illustrates one graphical layer within the full-screen size graphical layer 606; however, any number of graphical layers may be within the full-screen size graphical layer 606.

Calculating whether pixel 656 is within graphical layer 654 may best be illustrated by way of example. Equation 1 may be used to determine if the pixel is within the graphical layer in the horizontal direction. Assuming u=0.275, W=400 pixels, polyW=200 pixels, polyX=50 pixels, then polyu=0.4 indicating that pixel 656 is within graphical layer 654 in the horizontal direction. Further, equation 3 may be used to determine if the pixel is within the graphical layer in the vertical direction. Assuming v=0.15625, H=400 pixels, polyH=150 pixels, polyY=50 pixels, then polyv=0.75, indicating that pixel 656 is within graphical layer 654. Therefore, color information may be determined by the pixel processing module for pixel 656 and graphical layer 654 for this example. As previously discussed above, a determination may be made as to whether each pixel is within each of the graphical layers of a graphical display or scene.

Figure 7:
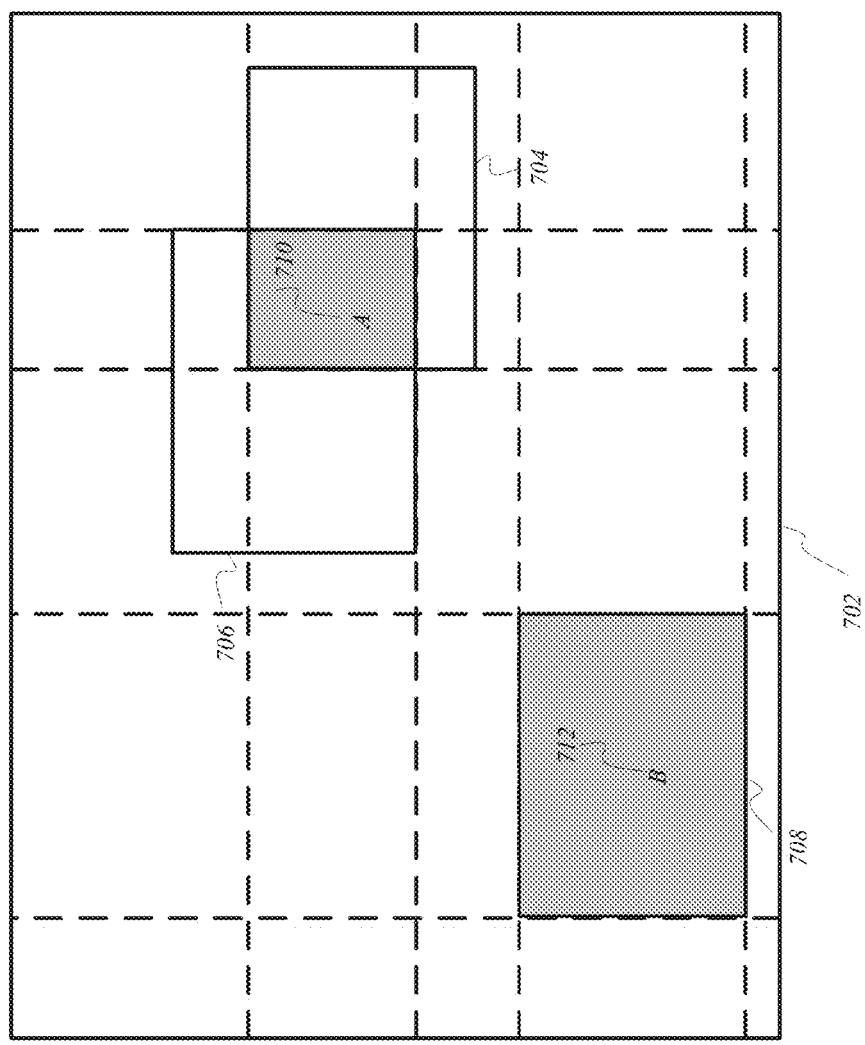
FIG. 7 illustrates an embodiment of a first tiled graphical display.

FIG. 7 illustrates an embodiment of a graphical display 700 divided into regions. In this exemplary embodiment, the graphical display 700 is shown as having two regions, region A 710 and region B 712. However, the graphical display 700 may be divided into any number of regions and may be based on a number of graphical layers in the graphical display or scene. More specifically, the graphical display 700 may divided into regions such that each region has a constant number of graphical layers within the entire region. In other words, a region cannot be created such that a portion of the region includes two graphical layers and portion of the region includes three graphical layers. Once graphical display is divided into regions, each region is analyzed or processed to determine how many and which graphical layers are in each region.

For example, region A 710 is illustrated as having three graphical layers within the region, full-screen size graphical layer 702 and graphical layer 704 and graphical layer 706. In another example, region B 712 is shown as having two graphical layers within the region, full-screen size graphical layer 702 and graphical layer 712. Once each region is processed, the pixel processing module may then be configured for each region or each region may have separate pixel processing program or module associated with the region. Each region may then be separately processed to determine pixel color information for pixels within each of the regions.

By dividing the graphical display 700 into regions, a determination does not have to be made as to whether each pixel is within each of the layers of the entire graphical display 700 while processing the regions. The number of graphical layers and which graphical layers are present within each of the regions is determined and known, as discussed above. Thus, significant processing reduction in processing time and memory bandwidth usage may be achieved.

In addition, regions having opaque graphical layers may be specially processed by stopping or exiting the pixel color determination process when the opaque layer is reached. More specifically, when graphical layers are processed in a front-to-back order to determine if a pixel is within a graphical layer and color information for the pixel, the process may stop when the opaque layer is reached because graphical layers behind the opaque graphical layer cannot be seen and color information from these graphical layers are not blended with the other graphical layers color information. Therefore, by stopping the processing of the pixel at the opaque layer processing time and memory bandwidth usage may be reduced even more.

Figure 8:
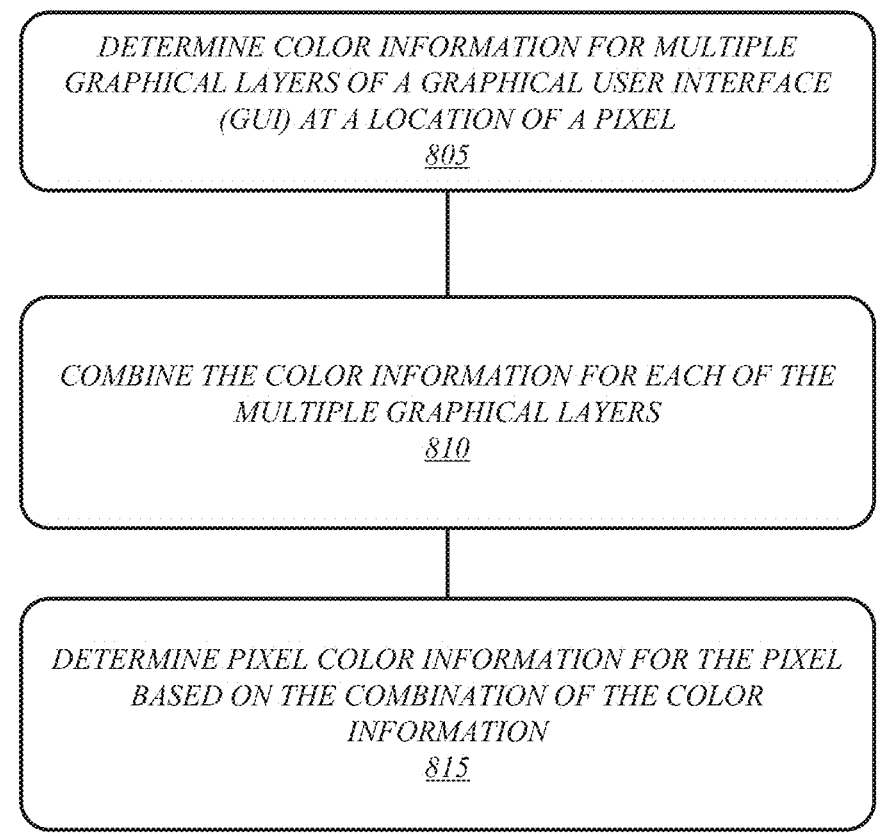
FIG. 8 illustrates an embodiment of a second logic flow.

FIG. 8 illustrates one embodiment of a second logic flow 800. The logic flow 800 may be representative of some or all of the operations executed by one or more embodiments described herein. For example, the logic flow 800 may illustrate operations performed by system 100 and 200. In the illustrated embodiment shown in FIG. 8, the logic flow 800 may determine color information for two or more graphical layers of a graphical user interface (GUI) at a location of a pixel at block 805. More specifically, pixel processing module may determine if a pixel is within graphical layers of a graphical display based on the location of the pixel. The pixel processing module may then determine color information for each of the graphical layers having the pixel within the graphical layer based on a relative layer pixel location. The color information for each of the graphical layers may be read or retrieved from a texture buffer utilizing a texture map and texture coordinates at a layer pixel location.

At block 810, the color information for each of the two or more graphical layers may be combined. More specifically, the color information read from the texture buffer may be combined or blended together by the pixel processing module. Further, at block 815, the logic flow 800 may determine pixel color information for the pixel based on the combination of the color information. The pixel color information may be a result of the combining or blending of all the color information for each of the graphical layers having the pixel within the boundaries of the graphical layer in the graphical display.

Figure 9:
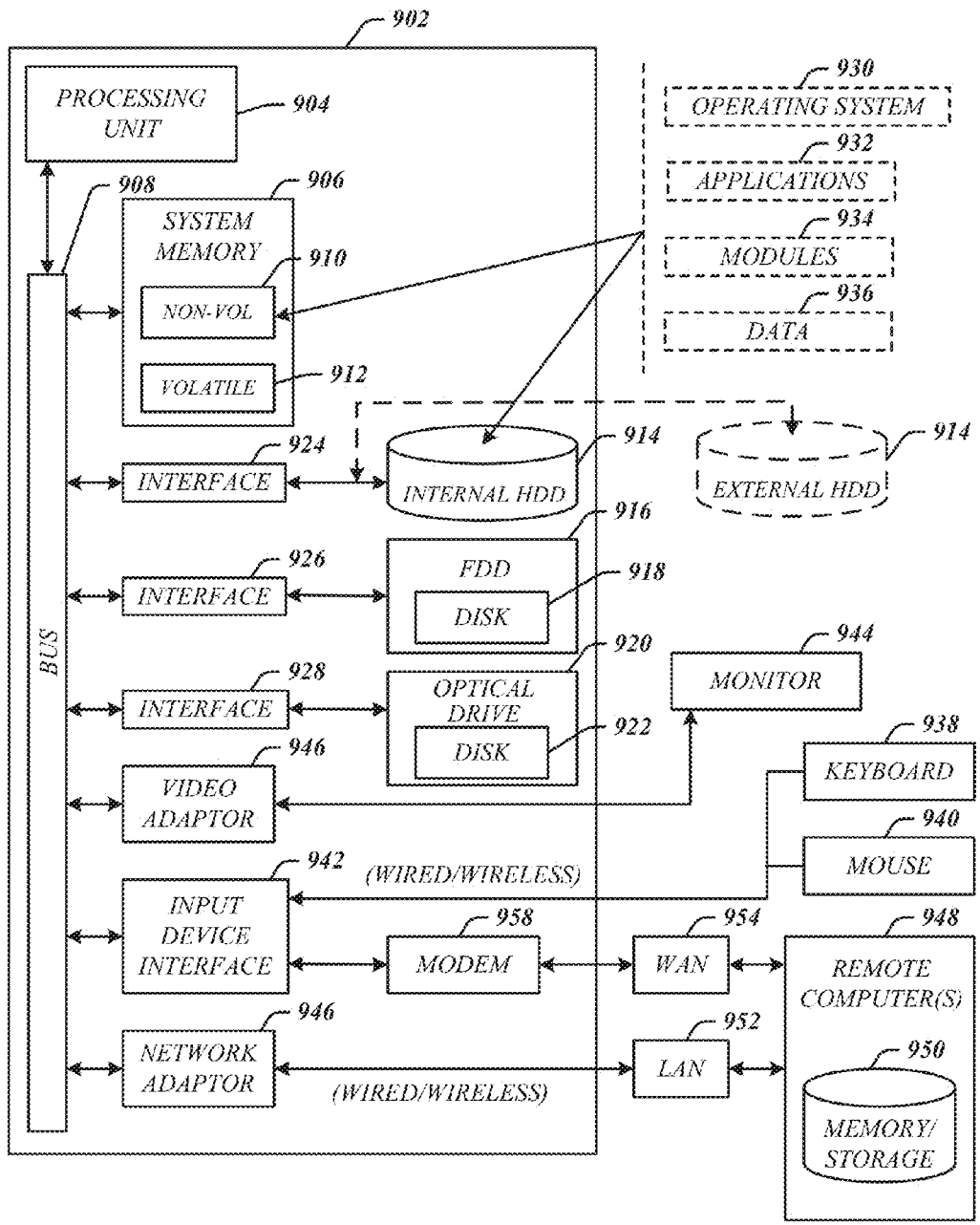
FIG. 9 illustrates an embodiment of a first computer architecture.

FIG. 9 illustrates an embodiment of an exemplary computing architecture 900 suitable for implementing various embodiments as previously described. In one embodiment, the computing architecture 900 may comprise or be implemented as part of computing device 105.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 804, a system memory 906 and a system bus 908. The processing unit 804 can be any of various commercially available processors.

The system bus 908 provides an interface for system components including, but not limited to, the system memory 906 to the processing unit 804. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), program-mable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 700.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 902 family of standards, such as wireless devices operatively disposed in wireless communication (e.g., IEEE 902.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 902.11x (a, b, g, n, etc.) to provide secure, reliable, fast wireless connectivity. A Wi-Fi network can be used to connect computers to each other, to the Internet, and to wire networks (which use IEEE 902.3-related media and functions).

The various elements of computing system 100 and 200 previously described with reference to FIGS. 1-9 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 10:
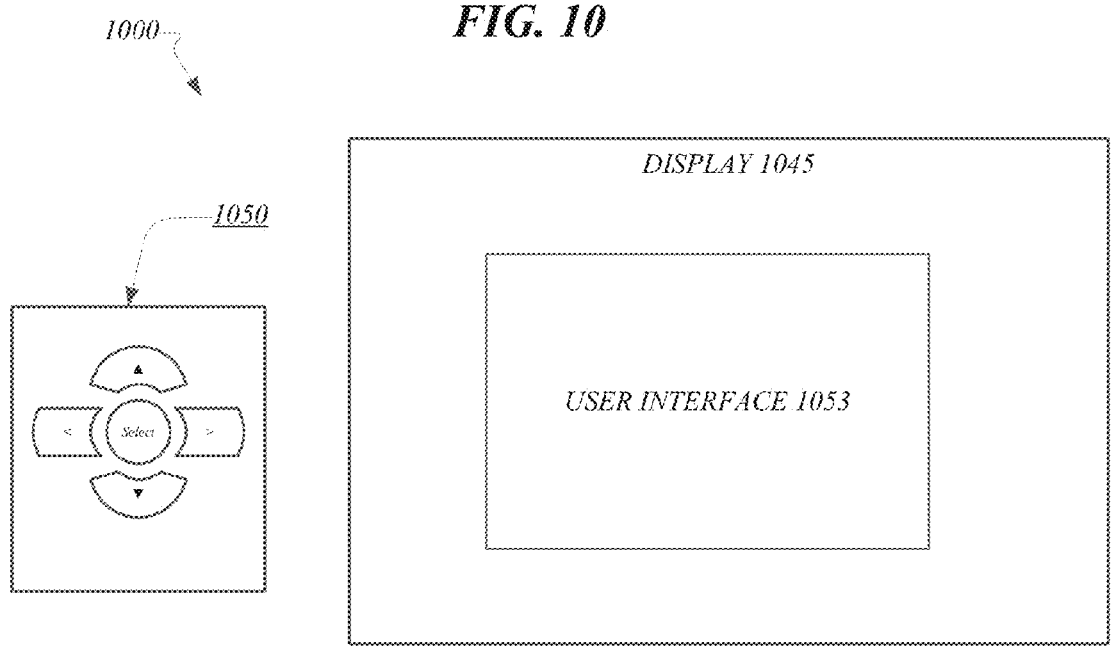
FIG. 10 illustrates an embodiment of a third computing system.
Figure 10:
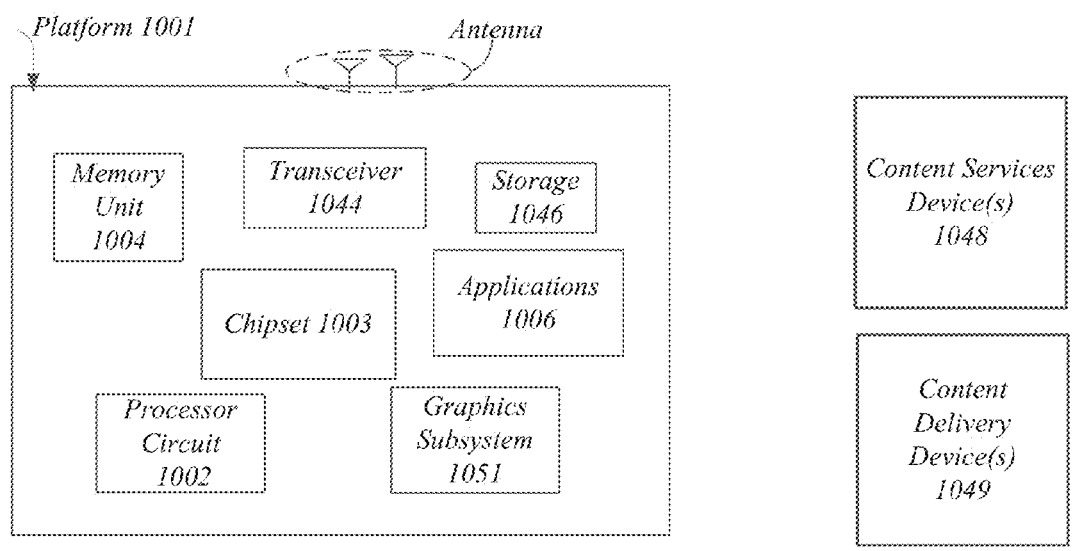
Figure 10:
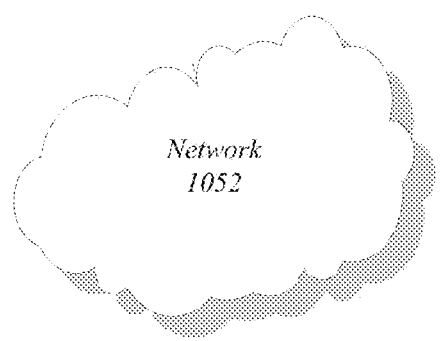

FIG. 10 illustrates an embodiment of a system 1000. In various embodiments, system 1000 may be representative of a system or architecture suitable for use with one or more embodiments described herein, such as computing device 105 of FIG. 1, system 200 of FIG. 2, logic flow 300 of FIG. 3, and logic flow 800 of FIG. 8. The embodiments are not limited in this respect.

As shown in FIG. 10, system 1000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 1000 as desired for a given implementation. The embodiments are not limited in this context.

In embodiments, system 1000 may be a media system although system 1000 is not limited to this context. For example, system 1000 may be incorporated into a personal computer (PC), laptop computer, ultra-laptop computer, tablet, touch pad, portable computer, handheld computer, palm-top computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1000 includes a platform 1001 coupled to a display 1045. Platform 1001 may receive content from a content device such as content services device(s) 1048 or content delivery device(s) 1049 or other similar content sources. A navigation controller 1050 including one or more navigation features may be used to interact with, for example, platform 1001 and/or display 1045. Each of these components is described in more detail below.

In embodiments, platform 1001 may include any combination of a processor circuit 1002, chipset 1003, memory unit 1004, transceiver 1044, storage 1046, applications 1006, and/or graphics subsystem 1052. Chipset 1003 may provide intercommunication among processor circuit 1002, memory unit 1004, transceiver 1044, storage 1046, applications 1006, and/or graphics subsystem 1052. For example, chipset 1003 may include a storage adapter (not depicted) capable of providing intercommunication with storage 1046.

Processor circuit 1002 may be implemented using any processor or logic device, and may be the same as or similar to processor circuit 102 in FIG. 1.

Memory unit 1004 may be implemented using any machine-readable or computer-readable media capable of storing data, and may be the same as or similar to memory unit 104 in FIG. 1.

Transceiver 1044 may include one or more radios capable of transmitting and receiving signals using various suitable wireless communications techniques, and may be the same as or similar to transceiver 144 in FIG. 1.

Display 1045 may include any television type monitor or display, and may be the same as or similar to display 145 in FIG. 1.

Storage 1046 may be implemented as a non-volatile storage device, and may be the same as or similar to storage 146 in FIG. 1.

Graphics subsystem 1052 may perform processing of images such as still or video for display. Graphics subsystem 1052 may be a graphics processing unit (GPU) or a visual processing unit (VPU), and may the same or similar to the GPU 106 in FIG. 1. An analog or digital interface may be used to communicatively couple graphics subsystem 1052 and display 1045. For example, the interface may be any of a High-Definition Multimedia Interface, DisplayPort, wireless HDMI, and/or wireless HD compliant techniques. Graphics subsystem 1052 could be integrated into processor circuit 1002 or chipset 1003. Graphics subsystem 1052 could be a stand-alone card communicatively coupled to chipset 1003.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1048 may be hosted by any national, international and/or independent service and thus accessible to platform 1001 via the Internet, for example. Content services device(s) 1048 may be coupled to platform 1001 and/or to display 1045. Platform 1001 and/or content services device(s) 1048 may be coupled to a network 1053 to communicate (e.g., send and/or receive) media information to and from network 1053. Content delivery device(s) 1049 also may be coupled to platform 1001 and/or to display 1045.

In embodiments, content services device(s) 1048 may include a cable television box, personal computer, network, telephone, Internet enabled devices or appliance capable of delivering digital information and/or content, and any other similar device capable of unidirectionally or bidirectionally communicating content between content providers and platform 1001 and/display 1045, via network 1053 or directly. It will be appreciated that the content may be communicated unidirectionally and/or bidirectionally to and from any one of the components in system 1000 and a content provider via network 1053. Examples of content may include any media information including, for example, video, music, medical and gaming information, and so forth.

Content services device(s) 1048 receives content such as cable television programming including media information, digital information, and/or other content. Examples of content providers may include any cable or satellite television or radio or Internet content providers. The provided examples are not meant to limit embodiments.

In embodiments, platform 1001 may receive control signals from navigation controller 1050 having one or more navigation features. The navigation features of navigation controller 1150 may be used to interact with a user interface 854, for example. In embodiments, navigation controller 1050 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be echoed on a display (e.g., display 1045) by movements of a pointer, cursor, focus ring, or other visual indicators displayed on the display. For example, under the control of software applications 1006, the navigation features located on navigation controller 1050 may be mapped to virtual navigation features displayed on user interface 854. In embodiments, navigation controller 1050 may not be a separate component but integrated into platform 1001 and/or display 1045. Embodiments, however, are not limited to the elements or in the context shown or described herein.

In embodiments, drivers (not shown) may include technology to enable users to instantly turn on and off platform 1001 like a television with the touch of a button after initial boot-up, when enabled, for example. Program logic may allow platform 1001 to stream content to media adaptors or other content services device(s) 1048 or content delivery device(s) 1049 when the platform is turned "off." In addition, chip set 1003 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1000 may be integrated. For example, platform 1001 and content services device(s) 1048 may be integrated, or platform 1001 and content delivery device(s) 1049 may be integrated, or platform 1001, content services device(s) 1048, and content delivery device(s) 1049 may be integrated, for example. In various embodiments, platform 1001 and display 1045 may be an integrated unit. Display 1045 and content service device(s) 1048 may be integrated, or display 1045 and content delivery device(s) 1049 may be integrated, for example. These examples are not meant to limiting in nature.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1001 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
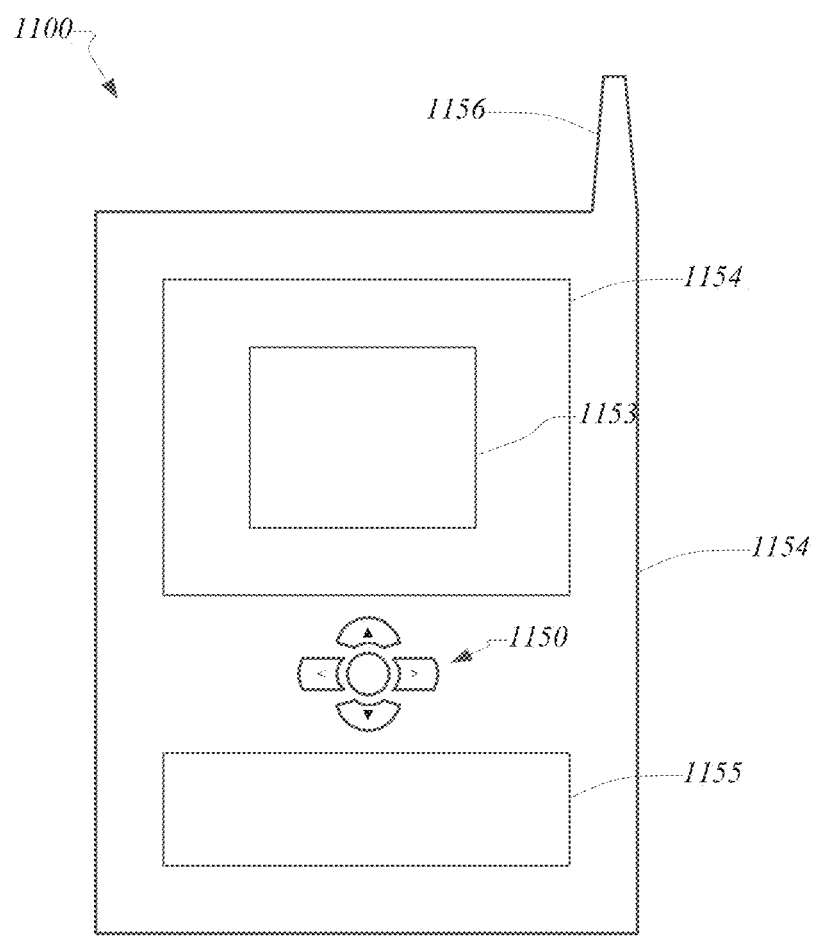
FIG. 11 illustrates an embodiment of a first computing device.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a display 1145, a navigation controller 1150, a user interface 1154, a housing 1155, an I/O device 1156, and an antenna 857. Display 1145 may include any suitable display unit for displaying information appropriate for a mobile computing device, and may be the same as or similar to display 845 in FIG. 8. Navigation controller 1150 may include one or more navigation features which may be used to interact with user interface 1154, and may be the same as or similar to navigation controller 850 in FIG. 8. I/O device 1156 may include any suitable I/O device for entering information into a mobile computing device. Examples for I/O device 1156 may include an alphanumeric keyboard, a numeric keypad, a touch pad, input keys, buttons, switches, rocker switches, microphones, speakers, voice recognition device and software, and so forth. Information also may be entered into device 1100 by way of microphone. Such information may be digitized by a voice recognition device. The embodiments are not limited in this context.

The detailed disclosure now turns to providing examples that pertain to further embodiments. Examples one through thirty-two (1-32) provided below are intended to be exemplary and non-limiting.

In a first example, an apparatus or computing device may include processing circuitry and a pixel processing module for execution on the processing circuitry to determine color information for multiple graphical layers of a graphical display at a location of a pixel and to determine a pixel color information for the pixel at the location based on the color information for each of the multiple graphical layers.

In a second example and in furtherance of any of the first examples, an apparatus or computing device may include the pixel processing module to determine the pixel color information prior to sending the pixel color information to the frame buffer and to send the pixel color information to a frame buffer.

In a third example and in furtherance of any of the previous examples, an apparatus or computing device may include the pixel processing module to determine the pixel color information without reading color information for each of the multiple graphical layers from a frame buffer.

In a fourth example and in furtherance of any of the previous examples, an apparatus or computing device may include the pixel processing module to determine the pixel color information without writing color information for each of the multiple graphical layers to a frame buffer.

In a fifth example and in furtherance of any of the previous examples, an apparatus or computing device may include the pixel processing module to determine whether the pixel is within each of the multiple graphical layers in the graphical display and to determine the color information for each of the graphical layers having the pixel within the graphical layer.

In a sixth example and in furtherance of any of the previous examples, an apparatus or computing device may include the pixel processing module to determine the location of the pixel in the graphical display and a layer pixel location for each of the multiple graphical layers at the location of the pixel in the graphical display.

In a seventh example and in furtherance of any of the previous examples, an apparatus or computing device may include the pixel processing module to determine the layer pixel location based on a scaling factor and a bias factor for two-dimensional (2D) coordinates for each of the multiple graphical layers.

In an eighth example and in furtherance of any of the previous examples, an apparatus or computing device may include the pixel processing module to exclude determining color information for graphical layers of the graphical display not present at the location of the pixel.

In a ninth example and in furtherance of any of the previous examples, an apparatus or computing device may include the pixel processing module the pixel processing module to divide the graphical display into a plurality of regions including multiple graphical layers.

In an tenth example and in furtherance of any of the previous examples, an apparatus or computing device may include the pixel processing module to determine the color information at the location of the pixel for each graphical layer located within a particular region.

In an eleventh example and in furtherance of any of the previous examples, an apparatus or computing device may include the processing circuitry to configure the pixel processing module to process each particular region based on a number of graphical layers in the particular region.

In a twelfth example and in furtherance of any of the previous examples, an apparatus or computing device may include the color information comprising red, green, and blue color information.

In a thirteenth example and in furtherance of any of the previous examples, an apparatus or computing device may include a display device; a transceiver; an antenna; and an input device, and the display device to present the pixel at the location based on the pixel color information.

In a fourteenth example and in furtherance of any of the previous examples, a computer-implemented method may include determining, by a graphics processing unit (GPU), color information for multiple graphical layers of a graphical user interface (GUI) at a location of a pixel, combining the color information for each of the multiple graphical layers and determining pixel color information for the pixel based on the combination of the color information.

In a fifteenth example and in furtherance of any of the previous examples, a computer-implemented method may include writing the pixel color information to a frame buffer and presenting the pixel on a graphical display based on the pixel color information in the frame buffer.

In a sixteenth example and in furtherance of any of the previous examples, a computer-implemented method may include determining whether the pixel at the location is within each of the multiple graphical layers.

In a seventeenth example and in furtherance of any of the previous examples, a computer-implemented method may include combining the color information for the graphical layers without reading color information from a frame buffer.

In an eighteenth example and in furtherance of any of the previous examples, a computer-implemented method may include combining the color information for the graphical layers without writing color information to a frame buffer.

In a nineteenth example and in furtherance of any of the previous examples, a computer-implemented method may include combining the color information for the graphical layers prior to writing the pixel color information to the frame buffer.

In a twentieth example and in furtherance of any of the previous examples, an article comprising a computer-readable storage medium containing a plurality of instructions that when executed may enable a computing device to determine color information for multiple graphical layers of a graphical user interface (GUI) at a location of a pixel, combine the color information for each of the multiple graphical layers and determine pixel color information for the pixel based on the combination of the color information.

In a twenty-first example and in furtherance of any of the previous examples, an article comprising a computer-readable storage medium containing a plurality of instructions that when executed may enable a computing device to write the pixel color information to a frame buffer and present the pixel on a graphical display based on the pixel color information in the frame buffer.

In a twenty-second example and in furtherance of any of the previous examples, an article comprising a computer-readable storage medium containing a plurality of instructions that when executed may enable a computing device to determine whether the pixel at the location is within each of the multiple graphical layers.

In a twenty-third example and in furtherance of any of the previous examples, an article comprising a computer-readable storage medium containing a plurality of instructions that when executed may enable a computing device to combine the color information for the graphical layers without reading color information from a frame buffer.

In a twenty-fourth example and in furtherance of any of the previous examples, an article comprising a computer-readable storage medium containing a plurality of instructions that when executed may enable a computing device to combine the color information for the graphical layers without writing color information to a frame buffer.

In a twenty-fifth example and in furtherance of any of the previous examples, an article comprising a computer-readable storage medium containing a plurality of instructions that when executed may enable a computing device to combine the color information for the graphical layers prior to writing the pixel color information to the frame buffer.

In a twenty-sixth example and in furtherance of any of the previous examples, an apparatus may include means for determining color information for multiple graphical layers of a graphical user interface (GUI) at a location of a pixel, means for combining the color information for each of the multiple graphical layers and means for determining pixel color information for the pixel based on the combination of the color information.

In a twenty-seventh example and in furtherance of any of the previous examples, an apparatus may include means for writing the pixel color information to a frame buffer and means for presenting the pixel on a graphical display based on the pixel color information in the frame buffer.

In a twenty-eighth example and in furtherance of any of the previous examples, an apparatus may include means for determining whether the pixel at the location is within each of the multiple graphical layers.

In a twenty-ninth example and in furtherance of any of the previous examples, an apparatus may include means for combining the color information for the graphical layers without reading color information from a frame buffer.

In a thirtieth example and in furtherance of any of the previous examples, an apparatus may include means for combining the color information for the graphical layers without writing color information to a frame buffer.

In a thirty-first example and in furtherance of any of the previous examples, an apparatus may include means for means for combining the color information for the graphical layers prior to writing the pixel color information to the frame buffer.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
processing circuitry; and
a pixel processing module for execution on the processing circuitry to determine color information for multiple graphical layers of a graphical display at a location of a pixel, determine a pixel color information for the pixel at the location based on the color information for each of the multiple graphical layers, and determine a layer pixel location based on a scaling factor and a bias factor for two-dimensional (2D) coordinates for each of the one or more graphical layers.

2. The apparatus of claim 1, wherein the pixel processing module is to send the pixel color information to a frame buffer.

3. The apparatus of claim 1, wherein the pixel processing module is to determine the pixel color information without reading color information for each of the multiple graphical layers from a frame buffer.

4. The apparatus of claim 1, wherein the pixel processing module is to determine the pixel color information without writing color information for each of the multiple graphical layers to a frame buffer.

5. The apparatus of claim 1, wherein the pixel processing module is to determine whether the pixel is within each of the multiple graphical layers in the graphical display and to determine the color information for each of the graphical layers having the pixel within the graphical layer.

6. The apparatus of claim 1, wherein the pixel processing module is to exclude determining color information for graphical layers of the graphical display not present at the location of the pixel.

7. The apparatus of claim 1, wherein the pixel processing module is to divide the graphical display into a plurality of regions including multiple graphical layers.

8. The apparatus of claim 7, wherein the pixel processing module is to determine the color information at the location of the pixel for each graphical layer located within a particular region of the plurality regions, and to determine the pixel color information based on the determined color information.

9. The apparatus of claim 7, wherein the processing circuitry is to configure the pixel processing module to process each particular region of the plurality of regions based on a number of graphical layers in the particular region.

10. The apparatus of claim 1, wherein the color information is to comprise red, green, and blue color information.

11. The apparatus of claim 1, comprising: a display device; a transceiver; an antenna; and an input device, wherein the display device is to present the pixel at the location based on the pixel color information.

12. A computer-implemented method, comprising:
determining, by a graphics processing unit (GPU), color information for multiple graphical layers of a graphical user interface (GUI) at a location of a pixel;
combining the color information for each of the multiple graphical layers;
determining pixel color information for the pixel based on the combination of the color information; and
determining a layer pixel location based on a scaling factor and a bias factor for two-dimensional (2D) coordinates for each of the one or more graphical layers.

13. The computer-implemented method of claim 12, comprising:
writing the pixel color information to a frame buffer; and
presenting the pixel on a graphical display based on the pixel color information in the frame buffer.

14. The computer-implemented method of claim 13, the combining the color information comprising combining the color information for the graphical layers prior to writing the pixel color information to the frame buffer.

15. The computer-implemented method of claim 12, comprising:
determining whether the pixel at the location is within each of the multiple graphical layers.

16. The computer-implemented method of claim 12, the combining the color information comprising combining the color information for the graphical layers without reading color information from a frame buffer.

17. The computer-implemented method of claim 12, the combining the color information comprising combining the color information for the graphical layers without writing color information to a frame buffer.

18. An article comprising a non-transitory computer-readable storage medium containing a plurality of instructions that when executed enable a computing device to:
determine color information for multiple graphical layers of a graphical user interface (GUI) at a location of a pixel;
combine the color information for each of the multiple graphical layers;
determine pixel color information for the pixel based on the combination of the color information; and
determine a layer pixel location based on a scaling factor and a bias factor for two-dimensional (2D) coordinates for each of the one or more graphical layers.

19. The article of claim 18, the at least one non-transitory computer-readable storage medium comprising instructions that when executed enable the computing device to:
write the pixel color information to a frame buffer; and
present the pixel on a graphical display based on the pixel color information in the frame buffer.

20. The article of claim 18, the at least one non-transitory computer-readable storage medium comprising instructions that when executed enable the computing device to determine whether the pixel at the location is within each of the multiple graphical layers.

21. The article of claim 18, the at least one non-transitory computer-readable storage medium comprising instructions that when executed enable the computing device to combine the color information for the graphical layers without reading color information from a frame buffer.

22. The article of claim 18, the at least one non-transitory computer-readable storage medium comprising instructions that when executed enable the computing device to combine the color information for the graphical layers without writing color information to a frame buffer.

23. The article of claim 18, the at least one non-transitory computer-readable storage medium comprising instructions that when executed enable the computing device to combine the color information for the graphical layers prior to writing the pixel color information to the frame buffer.

* * * * *